(12) United States Patent
Forhan et al.

(10) Patent No.: US 7,779,335 B2
(45) Date of Patent: *Aug. 17, 2010

(54) ENHANCED ERROR IDENTIFICATION WITH DISK ARRAY PARITY CHECKING

(75) Inventors: Carl Edward Forhan, Rochester, MN (US); Robert Edward Galbraith, Rochester, MN (US); Adrian Cuenin Gerhard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 12/126,503

(22) Filed: May 23, 2008

(65) Prior Publication Data

US 2008/0229148 A1    Sep. 18, 2008

Related U.S. Application Data

(63) Continuation of application No. 10/994,088, filed on Nov. 19, 2004, now Pat. No. 7,392,458.

(51) Int. Cl.
*G11C 29/00* (2006.01)
(52) U.S. Cl. .................. 714/770; 711/114; 719/325
(58) Field of Classification Search ................. 714/770; 711/114; 719/325
See application file for complete search history.

(56) References Cited

U.S. PATENT DOCUMENTS

| | | | |
|---|---|---|---|
| 3,688,265 A | | 8/1972 | Carter et al. |
| 5,134,619 A | * | 7/1992 | Henson et al. ............... 714/770 |
| 5,140,592 A | * | 8/1992 | Idleman et al. ............... 714/5 |
| RE34,100 E | * | 10/1992 | Hartness ..................... 714/769 |
| 5,274,645 A | | 12/1993 | Idleman et al. |
| 5,285,451 A | | 2/1994 | Henson et al. |
| 5,390,187 A | | 2/1995 | Stallmo |
| 5,412,661 A | * | 5/1995 | Hao et al. ..................... 714/6 |
| 5,448,719 A | | 9/1995 | Schultz et al. |
| 5,488,731 A | | 1/1996 | Mendelsohn |
| 5,499,253 A | * | 3/1996 | Lary ........................... 714/770 |
| 5,530,948 A | | 6/1996 | Islam |
| 5,537,534 A | | 7/1996 | Voigt et al. |
| 5,537,567 A | | 7/1996 | Galbraith et al. |
| 5,617,530 A | | 4/1997 | Stallmo et al. |

(Continued)

OTHER PUBLICATIONS

IBM Technical Disclosure Bulletin, vol. 38, No. 7, Jul. '95, pp. 455-458, Foreground/Background Checking of Parity in a Redundant Array of Independent disks-5 Storage Substystem by Faunce, M.S. et al.

(Continued)

*Primary Examiner*—Joseph D Torres
(74) *Attorney, Agent, or Firm*—Wood, Herron & Evans, LLP

(57) ABSTRACT

When parity checking in a disk array such as a RAID-6 system determines data and parity information is unsynchronized, additional calculations are performed to determine whether the error may be attributed to faulty data on a disk drive or to a more systemic problem such as a faulty controller. In particular, for each particular error detected, the parity generating information is analyzed to determine if each error involves a common disk index. If so, the data can be corrected on that disk; if not other corrective procedures are implemented.

12 Claims, 3 Drawing Sheets

U.S. PATENT DOCUMENTS

| | | | |
|---|---|---|---|
| 5,673,412 | A | 9/1997 | Kamo et al. |
| 5,720,025 | A | 2/1998 | Wilkes et al. |
| 5,754,563 | A | 5/1998 | White |
| 5,911,779 | A | 6/1999 | Stallmo et al. |
| 5,948,110 | A | 9/1999 | Hitz et al. |
| 5,956,524 | A | 9/1999 | Gajjar et al. |
| 6,092,215 | A | 7/2000 | Hodges et al. |
| 6,101,615 | A * | 8/2000 | Lyons ............................ 714/6 |
| 6,279,050 | B1 | 8/2001 | Chilton et al. |
| 6,351,838 | B1 * | 2/2002 | Amelia ....................... 714/770 |
| 6,408,400 | B2 | 6/2002 | Taketa et al. |
| 6,480,944 | B2 | 11/2002 | Bradshaw et al. |
| 6,567,891 | B2 | 5/2003 | Oldfield et al. |
| 6,570,839 | B2 | 5/2003 | Kimura et al. |
| 6,687,872 | B2 | 2/2004 | Oldfield et al. |
| 6,836,820 | B1 | 12/2004 | Viswanathan et al. |
| 6,918,007 | B2 | 7/2005 | Chang et al. |
| 6,944,791 | B2 | 9/2005 | Humlicek et al. |
| 7,028,136 | B1 | 4/2006 | Priyadarshan et al. |
| 7,065,609 | B2 | 6/2006 | Eatherton et al. |
| 7,082,492 | B2 | 7/2006 | Pullela et al. |
| 7,111,227 | B2 | 9/2006 | Oldfield et al. |
| 7,206,946 | B2 | 4/2007 | Sakakibara et al. |
| 7,426,611 | B1 | 9/2008 | Gupta et al. |
| 2002/0166078 | A1 | 11/2002 | Oldfield et al. |
| 2002/0194427 | A1 | 12/2002 | Hashemi |
| 2005/0108613 | A1 * | 5/2005 | Kobayashi ................... 714/770 |
| 2006/0123268 | A1 * | 6/2006 | Forhan et al. ................... 714/6 |
| 2006/0123269 | A1 * | 6/2006 | Forhan et al. ................... 714/6 |

OTHER PUBLICATIONS

M.H. Jing et al., A fast error and erasure correction algorithm for a simple RS-RAID, IEEE2001, Oct. 29-Nov. 1, 2001, pp. 333-338.

Stephen J. Wicker, Error Control Systems for Digitial Communications, Prentice-Hall, 1995, pp. 204-211.

Torres, Joseph D., U.S. Patent and Trademark Office, Supplemental Notice of Allowability issued in related U.S. Appl. No. 10/994,088, dated May 23, 2008.

Torres, Joseph D., U.S. Patent and Trademark Office, Notice of Allowance issued in related U.S. Appl. No. 10/994,088, dated Mar. 19, 2008.

Torres, Joseph D., U.S. Patent and Trademark Office, Final Office Action issued in related U.S. Appl. No. 10/994,088, dated Oct. 17, 2007.

Torres, Joseph D., U.S. Patent and Trademark Office, Office Action issued in related U.S. Appl. No. 10/994,088, dated Jul. 3, 2007.

* cited by examiner

ENHANCED ERROR IDENTIFICATION WITH DISK ARRAY PARITY CHECKING

CROSS-REFERENCE TO RELATED APPLICATIONS

This application is a continuation of U.S. patent application Ser. No. 10/994,088, filed on Nov. 19, 2004, now U.S. Pat. No. 7,392,458 by Carl Edward Forhan et al., and is related to the following U.S. patent applications all filed by Carl Edward Forhan, Robert Edward Galbraith and Adrian Cuenin Gerhard: Ser. Nos. 11/873,085, 11/873,086, 11/873,087, and 11/873,088, all filed Oct. 16, 2007, and entitled "RAID ENVIRONMENT INCORPORATING HARDWARE-BASED FINITE FIELD MULTIPLIER FOR ON-THE-FLY XOR," all divisionals of Ser. No. 10/994,099, filed Nov. 19, 2004; Ser. No. 11/867,407, entitled "METHOD AND SYSTEM FOR IMPROVED BUFFER UTILIZATION FOR DISK ARRAY PARITY UPDATES," which is a continuation of Ser. No. 10/994,086 filed Nov. 19, 2004 (now issued as U.S. Pat. No. 7,290,199); Ser. No. 11/923,280, entitled "METHOD AND SYSTEM FOR INCREASING PARALLELISM OF DISK ACCESSES WHEN RESTORING DATA IN A DISK ARRAY SYSTEM," which is a continuation of Ser. No. 10/994,098, filed Nov. 19, 2004; and Ser. No. 12/106,856 entitled "RECOVERING FROM ABNORMAL INTERRUPTION OF A PARITY UPDATE OPERATION IN A DISK ARRAY SYSTEM," which is a continuation of Ser. No. 10/994,097, filed Nov. 19, 2004. In addition, this application is related to U.S. patent application Ser. No. 12/126,521, filed May. 23 2008 entitled "ENHANCED ERROR IDENTIFICATION WITH DISK ARRAY PARITY CHECKING," which is a divisional of the aforementioned Ser. No. 10/994,088 application. The entire disclosures of these applications are incorporated by reference herein.

FIELD OF THE INVENTION

The present invention relates to data protection methods for data storage and, more particularly, to systems implementing RAID-6 and similar data protection and recovery strategies.

BACKGROUND OF THE INVENTION

RAID stands for Redundant Array of Independent Disks and is a taxonomy of redundant disk array storage schemes which define a number of ways of configuring and using multiple computer disk drives to achieve varying levels of availability, performance, capacity and cost while appearing to the software application as a single large capacity drive. Typical RAID storage subsystems can be implemented in either hardware or software. In the former instance, the RAID algorithms are packaged into separate controller hardware coupled to the computer input/output ("I/O") bus and, although adding little or no central processing unit ("CPU") overhead, the additional hardware required nevertheless adds to the overall system cost. On the other hand, software implementations incorporate the RAID algorithms into system software executed by the main processor together with the operating system, obviating the need and cost of a separate hardware controller, yet adding to CPU overhead.

Various RAID levels have been defined from RAID-0 to RAID-6, each offering tradeoffs in the previously mentioned factors. RAID-0 is nothing more than traditional striping in which user data is broken into chunks which are stored onto the stripe set by being spread across multiple disks with no data redundancy. RAID-1 is equivalent to conventional "shadowing" or "mirroring" techniques and is the simplest method of achieving data redundancy by having, for each disk, another containing the same data and writing to both disks simultaneously. The combination of RAID-0 and RAID-1 is typically referred to as RAID-0+1 and is implemented by striping shadow sets resulting in the relative performance advantages of both RAID levels. RAID-2, which utilizes Hamming Code written across the members of the RAID set is not now considered to be of significant importance.

In RAID-3, data is striped across a set of disks with the addition of a separate dedicated drive to hold parity data. The parity data is calculated dynamically as user data is written to the other disks to allow reconstruction of the original user data if a drive fails without requiring replication of the data bit-for-bit. Error detection and correction codes ("ECC") such as Exclusive-OR ("XOR") or more sophisticated Reed-Solomon techniques may be used to perform the necessary mathematical calculations on the binary data to produce the parity information in RAID-3 and higher level implementations. While parity allows the reconstruction of the user data in the event of a drive failure, the speed of such reconstruction is a function of system workload and the particular algorithm used.

As with RAID-3, the RAID scheme known as RAID-4 consists of N data disks and one parity disk wherein the parity disk sectors contain the bitwise XOR of the corresponding sectors on each data disk. This allows the contents of the data in the RAID set to survive the failure of any one disk. RAID-5 is a modification of RAID-4 which stripes the parity across all of the disks in the array in order to statistically equalize the load on the disks.

The designation of RAID-6 has been used colloquially to describe RAID schemes that can withstand the failure of two disks without losing data through the use of two parity drives (commonly referred to as the "P" and "Q" drives) for redundancy and sophisticated ECC techniques. Although the term "parity" is used to describe the codes used in RAID-6 technologies, the codes are more correctly a type of ECC code rather than simply a parity code. Data and ECC information are striped across all members of the RAID set and write performance is generally lower than with RAID-5 because three separate drives must each be accessed twice during writes. However, the principles of RAID-6 may be used to recover a number of drive failures depending on the number of "parity" drives that are used.

Some RAID-6 implementations are based upon Reed-Solomon algorithms, which depend on Galois Field arithmetic. A complete explanation of Galois Field arithmetic and the mathematics behind RAID-6 can be found in a variety of sources and, therefore, only a brief overview is provided below as background. The Galois Field arithmetic used in these RAID-6 implementations takes place in $GF(2^N)$. This is the field of polynomials with coefficients in $GF(2)$, modulo some generator polynomial of degree N. All the polynomials in this field are of degree $N-1$ or less, and their coefficients are all either 0 or 1, which means they can be represented by a vector of N coefficients all in $\{0,1\}$; that is, these polynomials "look" just like N-bit binary numbers. Polynomial addition in this Field is simply N-bit XOR, which has the property that every element of the Field is its own additive inverse, so addition and subtraction are the same operation. Polynomial multiplication in this Field, however, can be performed with table lookup techniques based upon logarithms or with simple combinational logic.

Each RAID-6 check code (i.e., P and Q) expresses an invariant relationship, or equation, between the data on the data disks of the RAID-6 array and the data on one or both of the check disks. If there are C check codes and a set of F disks fail, F<C, the failed disks can be reconstructed by selecting F of these equations and solving them simultaneously in $GF(2^N)$ for the F missing variables. In the RAID-6 systems implemented or contemplated today there are only 2 check disks—check disk P, and check disk Q. It is worth noting that the check disks P and Q change for each stripe of data and parity across the array such that parity data is not written to a dedicated disk but is, instead, striped across all the disks.

Even though RAID-6 has been implemented with varying degrees of success in different ways in different systems, there remains an ongoing need to improve the efficiency and costs of providing RAID-6 protection for data storage. The mathematics of implementing RAID-6 involve complicated calculations that are also repetitive. Accordingly, efforts to improve the simplicity of circuitry, the cost of circuitry and the efficiency of the circuitry needed to implement RAID-6 remains a priority today and in the future.

For example, one aspect of RAID-4 and higher implementations is that, once parity data for a parity stripe is initially generated, later writes performed on the array typically require the parity to be updated by combining new data with old data and existing parity data to produce the new parity data. In RAID-4 and RAID-5 implementations, these update operations, often referred to as delta updates, require each RAID write to include a read from two drives (old data, old parity), the calculation of the difference between the new and old data, the application of that difference to the old parity to obtain the new parity, and the writing of the new data and parity back onto the same two drives, which typically requires four I/O operations to be performed. In RAID-6 implementations, a delta update typically takes six I/O operations, given the need to update two parity drives.

Since delta update operations operate as modifications of prior data, a problem with a single delta update operation can cause the parity data to become out of sync with the data, with the error being propagated to future delta update operations. A number of problems could occur in a delta update operation, e.g., if a disk returns incorrect data on a read of old data or old parity data, if a disk writes incorrect new data or new parity data, or if the RAID hardware or software XOR's the data incorrectly.

Out of sync parity, if left undetected, could cause a data integrity problem if a disk fails and the parity is needed to recreate data for that disk. Considering that millions or billions of delta updates can be performed over a relatively short period of time, the risk of a problem with a single delta update, and thus the parity getting out of sync, can be unacceptable for many implementations.

As a result, many RAID implementations employ parity checking, which typically runs in the foreground or the background (e.g., during periods of inactivity), and which checks all of the parity stripes to ensure that the parity data is in sync. The parity checking is only performed for a good (non-exposed) array for which the parity is expected to be valid.

When invalid parity data is detected during parity checking, however, conventional RAID implementations are unable to determine where the problem originated, e.g., what particular drive caused the problem, or if a hardware/software problem, rather than a particular drive, was the cause of the problem. As a result, such implementations typically alert a user or systems administrator of the problem, requiring manual intervention to determine the root cause of the problem.

SUMMARY OF THE INVENTION

To address these and other problems associated with the prior art, embodiments consistent with the invention utilize a parity checking algorithm in a disk array environment that is capable of assisting in the isolation of the particular source of a fault therein, e.g., to identify a particular disk drive, or to identify a source other than a disk drive, as the root cause of a problem detected as a result of parity checking.

One aspect of the present invention relates to the performance of parity checking in a disk array environment in which each parity stripe across a plurality of disk drives has an associated first and second parity value. In accordance with this aspect, the associated first parity value is verified for each of a plurality of data values; and if the respective first parity value is determined to be in error, then analysis is performed of first and second error values respectively associated with first and second parity equations. Based on the analysis, it is determined whether one of the plurality of disk drives is faulty.

Another aspect of the present invention relates to the performance of parity checking in a disk array environment such as a RAID-6 environment in which a plurality of bytes over a plurality of disks are checked, where each such byte has an associated first parity value and a second parity value. In accordance with this aspect, each byte for which a first parity equation is not satisfied is identified. For each identified byte, a first error value is calculated using the first parity equation and a second error value is calculated using a second parity equation. Based on the first error value and the second error value for each identified byte, a faulty disk drive in the RAID-6 environment may be identified.

DETAILED DESCRIPTION

Figure 1:
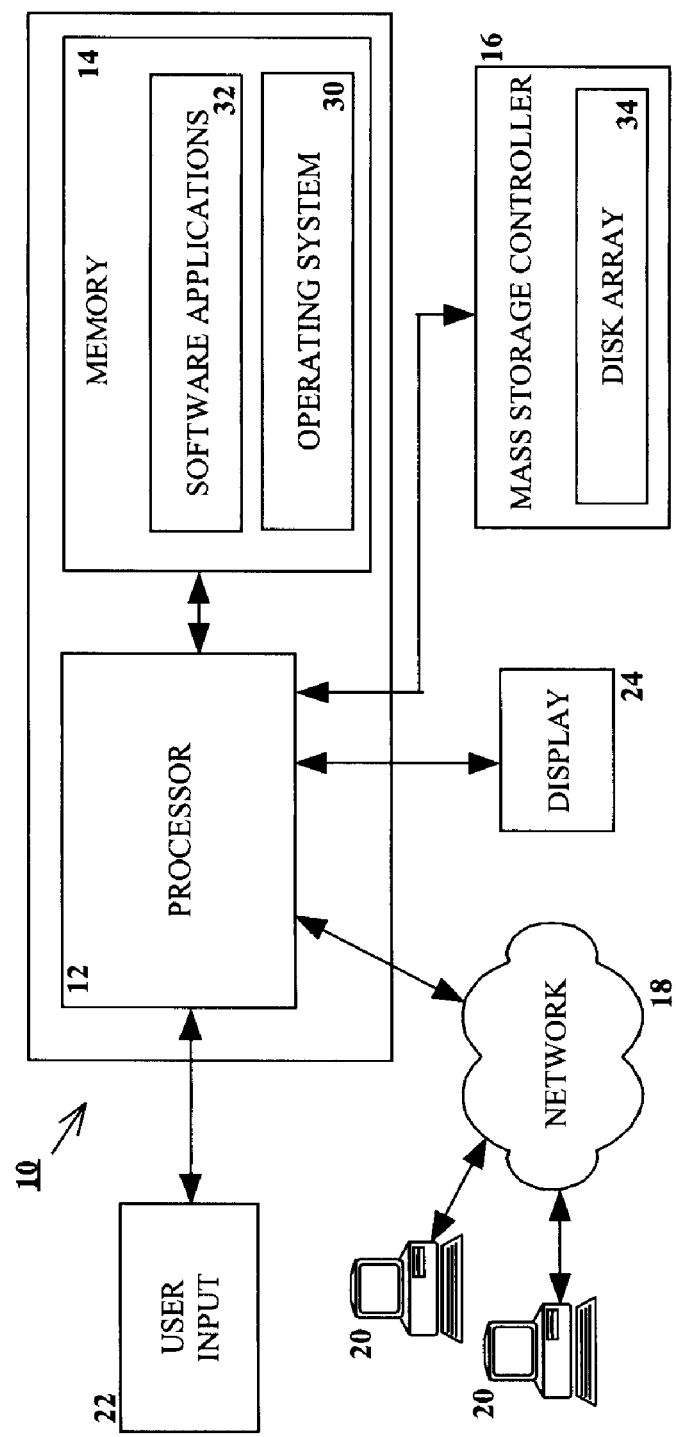
FIG. 1 is a block diagram of an exemplary computer system that can implement a RAID-6 storage controller in accordance with the principles of the present invention.

The embodiments discussed hereinafter utilize a parity checking algorithm in a disk array environment, e.g., a RAID-6 environment, that is capable of determining whether one of a plurality of disk drives in the RAID environment is faulty. In this regard, some embodiments of the invention may be capable of determining whether one of the disk drives in a RAID environment is faulty, or whether the fault lies in another component of the environment (e.g., an adapter or controller). Some embodiments may additionally or alternatively determine which specific disk drive among a plurality of disk drives in a disk array environment is faulty.

Presented hereinafter are a number of embodiments of a disk array environment implementing a parity checking and error detection algorithm consistent with the invention. However, prior to discussing such embodiments, a brief background on RAID-6 is provided, followed by a description of an exemplary hardware environment within which parity checking and error detection consistent with the invention may be implemented.

General RAID-6 Background

The nomenclature used herein to describe RAID-6 storage systems conforms to the most readily accepted standards for this field. In particular, there are N drives of which any two are considered to be the parity drives, P and Q. Using Galois Field arithmetic, two independent equations can be written:

$$\alpha^0 d_0 + \alpha^0 d_1 + \alpha^0 d_2 + \ldots + \alpha^0 d_{N-1} = 0 \quad (1)$$

$$\alpha^0 d_0 + \alpha^1 d_1 + \alpha^2 d_2 + \ldots + \alpha^{N-1} d_{N-1} = 0 \quad (2)$$

where the "+" operator used herein represents an Exclusive-OR (XOR) operation.

In these equations, $\alpha^x$ is an element of the finite field and $d_x$ is data from the $x^{th}$ disk. While the P and Q disk can be any of the N disks for any particular stripe of data, they are often noted as $d_P$ and $d_Q$. When data to one of the disks (i.e., $d_X$) is updated, the above two equations resolve to:

$$\Delta = (\text{old } d_X) + (\text{new } d_X) \quad (3)$$

$$(\text{new } d_P) = (\text{old } d_P) + ((\alpha_Q + \alpha_X)/(\alpha_P + \alpha^Q))\Delta \quad (4)$$

$$(\text{new } d_Q) = (\text{old } d_Q) + ((\alpha^P + \alpha^X)/(\alpha^P + \alpha^Q))\Delta \quad (5)$$

In each of the last two equations the term to the right of the addition sign is a constant multiplied by the change in the data (i.e., $\Delta$). These terms in equations (4) and (5) are often denoted as $K_1\Delta$ and $K_2\Delta$, respectively.

In the case of one missing, or unavailable drive, simple XOR'ing can be used to recover the drive's data. For example, if $d_1$ fails then $d_1$ can be restored by $$d_1 = d_0 + d_2 + d_3 + \ldots \quad (6)$$

In the case of two drives failing, or being "exposed", the above equations can be used to restore a drive's data. For example, given drives 0 through X and assuming drives A and B have failed, the data for either drive can be restored from the remaining drives. If for example, drive A was to be restored, the above equations reduce to:

$$d_A = ((\alpha^B + \alpha^0)/(\alpha^B + \alpha^A))d_0 + ((\alpha^B + \alpha^1)/(\alpha^B + \alpha^A))d_1 + \ldots + (\alpha^B + \alpha^X)/(\alpha^B + \alpha^A))d_X \quad (7)$$

Exemplary Hardware Environment

With this general background of RAID-6 in mind, attention can be turned to the drawings, wherein like numbers denote like parts throughout the several views. FIG. 1 illustrates an exemplary computer system in which a RAID-6, or other disk array, may be implemented. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on the disk array 34 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like. For additional storage, computer 10 may also include one or more mass storage devices accessed via a storage controller, or adapter, 16, e.g., removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

In accordance with the principles of the present invention, the mass storage controller 16 advantageously implements RAID-6 storage protection within an array of disks 34.

Computer 10 operates under the control of an operating system 30, and executes or otherwise relies upon various computer software applications, components, programs, objects, modules, data structures, etc. (e.g., software applications 32). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
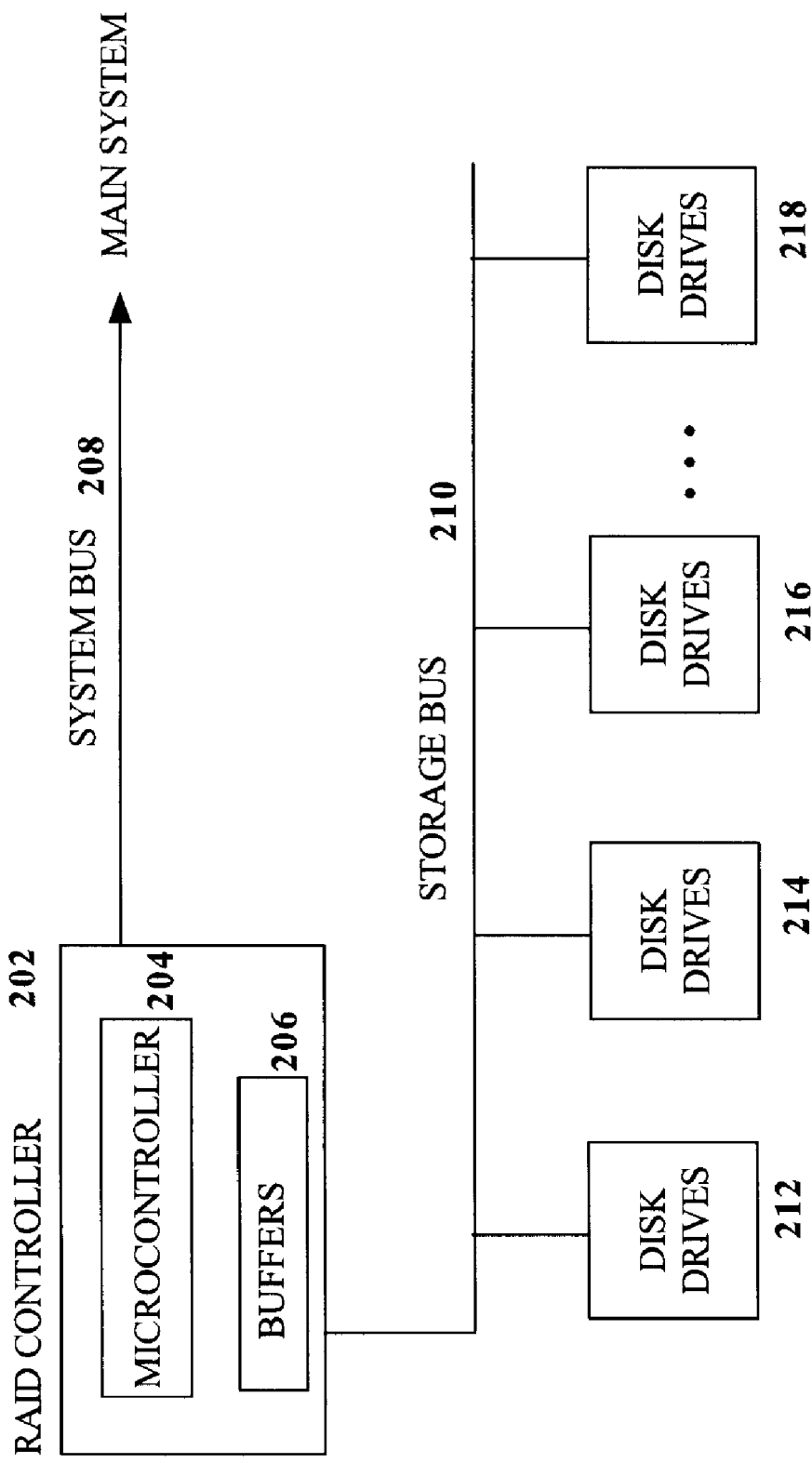
FIG. 2 is a block diagram illustrating the principal components of a RAID controller of FIG. 1.

FIG. 2 illustrates a block diagram of the control subsystem of a disk array system, e.g., a RAID-6 compatible system. In particular, the mass storage controller 16 of FIG. 1 is shown in more detail to include a RAID controller 202 that is coupled through a system bus 208 with the processor 12 and through a storage bus 210 to various disk drives 212-218. As known to one of ordinary skill, these buses may be proprietary in nature or conform to industry standards such as SCSI-1, SCSI-2, etc. The RAID controller includes a microcontroller 204 that executes program code that implements the RAID-6 algorithm for data protection, and that is typically resident in memory located in the RAID controller. In particular, data to be stored on the disks 212-218 is used to generate parity data and then broken apart and striped across the disks 212-218. The disk drives 212-218 can be individual disk drives that are directly coupled to the controller 202 through the bus 210 or may include their own disk drive adapters that permit a string a individual disk drives to be connected to the storage bus 210. In other words, a disk drive 212 may be physically implemented as 4 or 8 separate disk drives coupled to a single controller connected to the bus 210. As data is exchanged between the disk drives 212-218 and the RAID controller 202, in either direction, buffers 206 are provided to assist in the data transfers. The utilization of the buffers 206 can sometimes produce a bottle neck in data transfers and the inclusion of numerous buffers may increase cost, complexity and size of the RAID controller 202. Thus, certain embodiments of the present invention relate to provision and utilizing these buffers 206 in an economical and efficient manner.

It will be appreciated that the embodiment illustrated in FIGS. 1 and 2 is merely exemplary in nature. For example, it will be appreciated that the invention may be applicable to other disk array environments where multiple parity values are associated with each parity stripe and/or multiple independent equations are utilized in calculating parity data. It will also be appreciated that a disk array environment consistent with the invention may utilize a completely software-implemented control algorithm resident in the main storage of the computer, or that some functions handled via program code in a computer or controller can be implemented in hardware logic circuits, and vice versa. Therefore, the invention should not be limited to the particular embodiments discussed herein.

Parity Checking and Error Detection in RAID-6

Embodiments consistent with the invention implement error detection within a parity checking algorithm to assist in isolating the sources of errors in a RAID environment such as a RAID-6 environment.

As noted above, within a RAID-5 system, the parity P is updated according to a commonly known procedure that takes four I/O operations. First the old data, d, is read from a disk; then the new data d' is written to the disk; next the old parity data, P, is read from the disk; and finally the newly calculated parity P' is written to the disk. Should anything go wrong (e.g., a power or controller failure; incorrect XOR calculation; a write error; etc.) during these four steps, the data integrity of the disks may be placed in jeopardy. Also of note, delta update operations operate as modifications of prior data, so a problem with a single delta update operation can cause the parity data to become out of sync with the data, with the error being propagated to future delta update operations.

As also noted above, in conventional RAID-5 systems, background parity checking has been utilized to ensure the data integrity of a RAID system. For example, a background process would run during periods of inactivity that checked that the stripes of data and parity were correct. However, within RAID-5, if an error was found, insufficient information exists to determine whether a particular disk or an adapter, controller or other component is at fault. Or if it is a disk at fault, then which particular disk is at fault.

Similarly, background parity checking has been utilized to ensure data integrity in RAID-6 systems. As described above, with RAID-6, there are two independent equations that can be written for each parity stripe and are typically used to restore data in the case of multiple drive failures. Nonetheless, conventional RAID-6 systems, like RAID-5 systems, are still incapable of determining the potential source of an error.

However, it has been found that, in addition to restoring data, the independent equations utilized in parity checking in a RAID-6 system can be used to identify additional information about errors that might be located during parity checks, including of note, whether a particular disk drive is a source of an error detected during a parity check.

Figure 3:
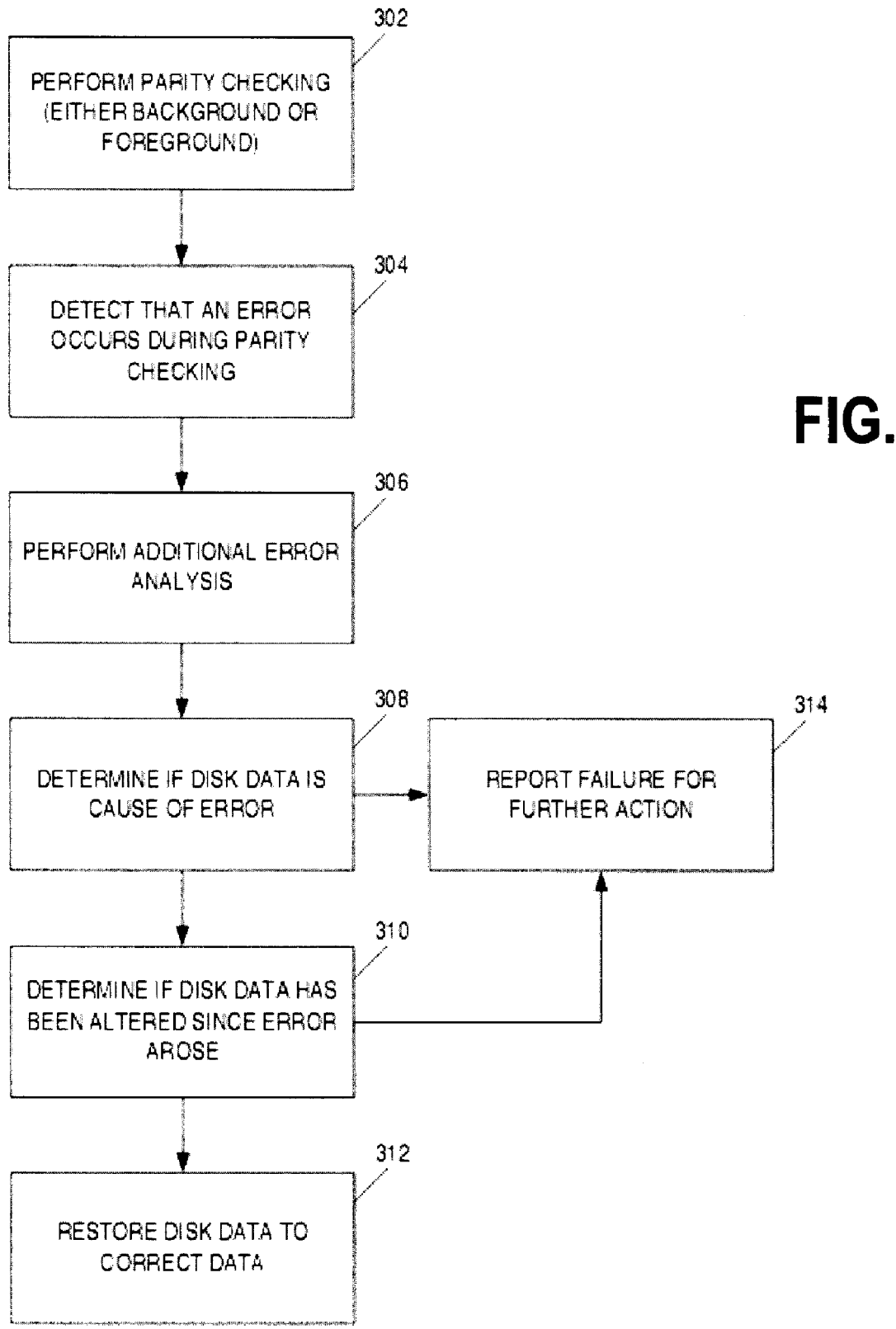
FIG. 3 depicts a flowchart for an exemplary method for performing additional error analysis within a RAID-6 environment in accordance with the principles of the present invention.

FIG. 3, for example, illustrates an exemplary parity checking process whereby additional error detection may be performed in a manner consistent with the invention. As shown in step 302, parity checking is performed to ensure that the data and parity on the disk drives is internally consistent. This checking may be performed in the foreground or background without departing from the scope of the present invention. However, a particular exemplary environment is described below in which the parity checking is performed as a background process. Assuming that parity checking discovers that the first principle equation (1) is not satisfied, in step 304, then further investigation can be performed, in step 306, to determine if a particular disk appears to be at fault. If a disk is determined to be at fault, in step 308, then control may pass to step 310 to determine whether the data on the disk has been altered since the error arose. If not, the correct disk data can be generated and restored to the disk, in step 312. If the data has been altered on the disk, the existence of the error can be reported, in step 314, so that other corrective actions may be performed by an operator. In addition, returning to step 308, if a particular disk is not at fault, then the existence of the error can be reported, in step 314, so that other corrective actions may be performed by an operator. In other embodiments, no attempt may be made to try to correct the data on an identified disk, whereby the only result of performing further investigation is the reporting of the likely source of an error as either a particular disk or a non-disk fault.

The aspects of RAID-6 that allow additional error investigation to be performed are explained below by way of an example. In particular, there is a disk, $d_F$, that is assumed to have incorrect data. As a result, the equations (1) and (2) are not satisfied (i.e., they do not add together to equal 0). Instead the equations with the faulty disk are:

$$\alpha^0 d_0 + \alpha^0 d_1 + \alpha^0 d_2 + \ldots \alpha^0 d_F + \ldots + \alpha^0 d_{N-1} = \Delta_F = S_0 \quad (8)$$

$$\alpha^0 d_0 + \alpha^1 d_1 + \alpha^2 d_2 + \ldots \alpha^F d_F + \ldots + \alpha^{N-1} d_{N-1} = \alpha^F \Delta_F = S_1 \quad (9)$$

where $\Delta_F$ is the difference between the faulty disk's expected and actual data.

Rearranging equations (8) and (9), gives:

$$S_1/S_0 = \alpha^F$$

Therefore, the index of the faulty disk, f, can be calculated according to:

$$f = \log(\alpha^F) = \log(S_1/S_0).$$

Because of the properties of addition in Galois Field arithmetic (i.e., the XOR operation), $d_F$ can be corrected, as shown in step 312, by the equation:

$$(\text{new } d_F) = (\text{old } d_F) + S_0$$

In one exemplary embodiment of the parity checking algorithm described above, the data, or symbol size, on the disks is 8 bits. By performing the parity checking over a number of bytes it can be determined with confidence whether a disk is at fault or not. For example, the parity checking may operate on 256 disk blocks at a time, each of which are 520 bytes in length. These values are exemplary in nature and other disk block size, symbol size, and number of blocks are contemplated within the scope of the present invention. However, using the exemplary values above a parity checking routine will check 133,120 bytes and thus solve the primary equation (1) that many times. If at least one of these checks indicate a failure then the following conditions are checked, in step 306, for each byte:

1. For each byte both $S_0$ and $S_1$ must both be zero or both be non-zero. If they both are zero then parity for that byte is correct. If one is zero and the other is non-zero, the error suggests that something other than a particular disk is at fault.
2. For each byte in which $S_0$ is nonzero (i.e., there is an error), then determine if $[\log(S_1/S_0)]$ indicates a valid disk index. For an 8-bit Galois Field, the permissible values of this equation could theoretically be between 0-254. However, in a disk array of 18 disks, for example, then the disk indexes range from 0 to 17. A value outside this permissible range suggests that something other than a particular disk is at fault.
3. For every byte in which $S_0$ is nonzero, then $\log(S_1/S_0)$ indicates the same disk index. This condition merely indicates that each error that has occurred appears to be located on the same disk drive.

If all three of these conditions are satisfied, then the errors are likely caused by faulty data on a disk, which can be reported for further corrective action. Moreover, as noted above, based upon the identification of a particular disk as the source of faulty data, in some instances the faulty data on the disk may also be corrected. On the other hand, if one of these three conditions is not met, then the errors are likely caused during the parity encoding operation and is the fault of the RAID controller or control software. In such instances, individual disk data should not be corrected.

Thus, embodiments of the present invention provide a method and system that utilizes RAID-6 parity information to not only detect unsynchronized data and parity but to perform further analysis which helps identify whether the data on the disk is faulty or the fault is likely the result of a RAID controller or component other than a specific disk.

Various modifications may be made to the illustrated embodiments without departing from the spirit and scope of the invention. For example, it may be desirable in some embodiments to resync parity after detection of a parity error. Other modifications will be apparent to one of ordinary skill in the art having the benefit of the instant disclosure. Therefore, the invention lies in the claims hereinafter appended.

What is claimed is:

1. An apparatus comprising:
   a least one processor;
   a memory coupled with the at least one processor; and
   a program code residing in the memory and executed by the at least one processor, the program code configured to:
      check a plurality of bytes over a plurality of disks in a RAID-6 environment to ensure parity data is in sync, each such byte associated with a first parity value and a second parity value;
      identify each byte for which a first parity equation is not satisfied;
      for each identified byte, calculate a first error value using the first parity equation;
      for each identified byte, calculate a second error value using a second parity equation; and
      based on the first error value and the second error value for each identified byte, identify a faulty disk drive in the RAID-6 environment, wherein the program code is configured to identify the faulty disk drive by:
         for each of the plurality of bytes, determining as a first condition if the first error value and the second error value are either both non-zero or both zero;
         for each of the identified bytes, determining as a second condition if the first and second error values indicate a valid disk index within the RAID-6 environment; and for each of the identified bytes, determining as a third condition if the valid disk index is the same for all such bytes.

2. The apparatus of claim 1, wherein the program code is further configured to:
   correct data on the faulty disk drive.

3. The apparatus of claim 1, wherein the program code is configured to determine whether a valid disk index is indicated by:
   calculating a value for the logarithm of the ratio between the second error value and the first error value; and
   determining if the calculated value is less than the number of disks in the plurality of disks.

4. The apparatus of claim 1, wherein the program code is configured to determine if each of the first, second and third conditions are satisfied, and if so, identify the faulty disk drive based on the valid disk index.

5. The apparatus of claim 1, wherein the program code is configured to determine if one of the first, second, and third conditions are not satisfied, and if so, determine the first parity equation was not satisfied because of a decoding failure.

6. The apparatus of claim 1, wherein the program code is configured to determine if one of the first, second and third conditions are not satisfied, and if so, identify a non-disk error as a cause of the first parity equation not being satisfied.

7. A computer program product comprising:
   a tangible computer usable medium having computer usable program code embodied therewith, the computer usable program code comprising:
   computer usable program code configured to:

check a plurality of bytes over a plurality of disks in a RAID-6 environment to ensure parity data is in sync, each such byte associated with a first parity value and a second parity value;

identify each byte for which a first parity equation is not satisfied;

for each identified byte, calculate a first error value using the first parity equation; for each identified byte, calculate a second error value using a second parity equation; and based on the first error value and the second error value for each identified byte, identify a faulty disk drive in the RAID-6 environment, wherein the program code is configured to identify the faulty disk drive by:

for each of the plurality of bytes, determining as a first condition if the first error value and the second error value are either both non-zero or both zero;

for each of the identified bytes, determining as a second condition if the first and second error values indicate a valid disk index within the RAID-6 environment; and for each of the identified bytes, determining as a third condition if the valid disk index is the same for all such bytes.

8. The program product of claim 7, wherein the program code is further configured to:

correct data on the faulty disk drive.

9. The program product of claim 7, wherein the program code is configured to determine whether a valid disk index is indicated by:

calculating a value for the logarithm of the ratio between the second error value and the first error value; and determining if the calculated value is less than the number of disks in the plurality of disks.

10. The program product of claim 7, wherein the program code is configured to determine if each of the first, second and third conditions are satisfied, and if so, identify the faulty disk drive based on the valid disk index.

11. The program product of claim 7, wherein the program code is configured to determine if one of the first, second, and third conditions are not satisfied, and if so, determine the first parity equation was not satisfied because of a decoding failure.

12. The program product of claim 7, wherein the program code is configured to determine if one of the first, second and third conditions are not satisfied, and if so, identify a non-disk error as a cause of the first parity equation not being satisfied.

* * * * *